(12) United States Patent
Greenwell

(10) Patent No.: US 7,677,208 B2
(45) Date of Patent: Mar. 16, 2010

(54) RADIAL ROTARY ENGINE WITH ENERGY STORAGE

(76) Inventor: Gary A. Greenwell, 102 Thunderbird La., Williamsburg, VA (US) 23185

( * ) Notice: Subject to any disclaimer, the term of this patent is extended or adjusted under 35 U.S.C. 154(b) by 180 days.

(21) Appl. No.: 11/790,107

(22) Filed: Apr. 24, 2007

(65) Prior Publication Data
US 2008/0240938 A1 Oct. 2, 2008

Related U.S. Application Data

(62) Division of application No. 10/946,549, filed on Sep. 22, 2004, now abandoned.
(60) Provisional application No. 60/570,440, filed on May 13, 2004, provisional application No. 60/794,144, filed on Apr. 24, 2006.

(51) Int. Cl.
*F02B 57/08* (2006.01)
*F02B 57/10* (2006.01)
*F02B 57/00* (2006.01)
*F04B 1/04* (2006.01)
*F04B 27/04* (2006.01)
*F01B 1/06* (2006.01)
*F01B 13/06* (2006.01)
*F01B 13/04* (2006.01)
*F01B 3/00* (2006.01)

(52) U.S. Cl. .................. 123/44 R; 123/43 R; 417/273; 91/497; 92/12.2
(58) Field of Classification Search .................. 417/273; 123/43 R, 44 R, 44 D, 44 E, 44 C, 44 A, 123/48 R, 48 B, 78 R, 78 BA, 78 F, 46 R; 91/497; 92/12.2; 180/165, 305; 60/517
See application file for complete search history.

(56) References Cited

U.S. PATENT DOCUMENTS

| | | | | | |
|---|---|---|---|---|---|
| 453,374 | A | * | 6/1891 | Clark | 417/273 |
| 651,157 | A | * | 6/1900 | Bergmann | 123/44 R |
| 682,385 | A | * | 9/1901 | McFarland, Jr. | 123/43 R |
| 791,071 | A | * | 5/1905 | Blayney | 123/43 R |
| 1,111,048 | A | * | 9/1914 | Wendt | 123/44 D |
| 1,243,691 | A | * | 10/1917 | Caproni | 123/43 R |

(Continued)

FOREIGN PATENT DOCUMENTS

JP 63297776 A * 12/1988

OTHER PUBLICATIONS http://www.dself.dsl.pipex.com/MUSEUM/POWER/waterengine/waterengine3.htm#rigg, printed Aug. 12, 2009, pp. 1-29.

*Primary Examiner*—Thai Ba Trieu
(74) *Attorney, Agent, or Firm*—Merek, Blackmon & Voorhees, LLC

(57) ABSTRACT

The present invention is directed to a rotary engine power transmission system for use in vehicular as well as other applications. The power system includes a rotary engine or pump, which may be pneumatic or hydraulic in configuration. The power system includes components whose purpose is to convert rotational force into pneumatic or hydraulic pressure where that same fluid pressure can be reconverted back into rotational force. This conversion can be from a source to a driven component, or from the driven component back to the same source for use, for example, in vehicular applications for use. One purpose in a vehicular specific application is to convert rotational source energy into rotational power at the vehicles wheels, for acceleration, and to reverse this process to recapture deceleration losses.

14 Claims, 10 Drawing Sheets

U.S. PATENT DOCUMENTS

| | | | |
|---|---|---|---|
| 1,658,705 A * | 2/1928 | Caproni | 417/273 |
| 1,968,694 A * | 7/1934 | Leibing | 123/44 C |
| 1,987,781 A * | 1/1935 | Maw | 91/497 |
| 2,491,693 A * | 12/1949 | Sivertsen | 123/44 R |
| 2,886,017 A * | 5/1959 | Dib | 123/43 R |
| 3,168,082 A * | 2/1965 | De Villiers | 123/44 D |
| 3,863,548 A * | 2/1975 | Vachon | 91/495 |
| 4,645,428 A * | 2/1987 | Arregui et al. | 417/273 |
| 4,751,819 A * | 6/1988 | Eder | 60/517 |
| 4,753,078 A * | 6/1988 | Gardner, Jr. | 180/305 |
| 5,049,039 A * | 9/1991 | Knoth et al. | 417/273 |
| 7,451,726 B1 * | 11/2008 | Sporea | 123/44 R |
| 2009/0159355 A1 * | 6/2009 | Garwood et al. | 180/165 |

* cited by examiner

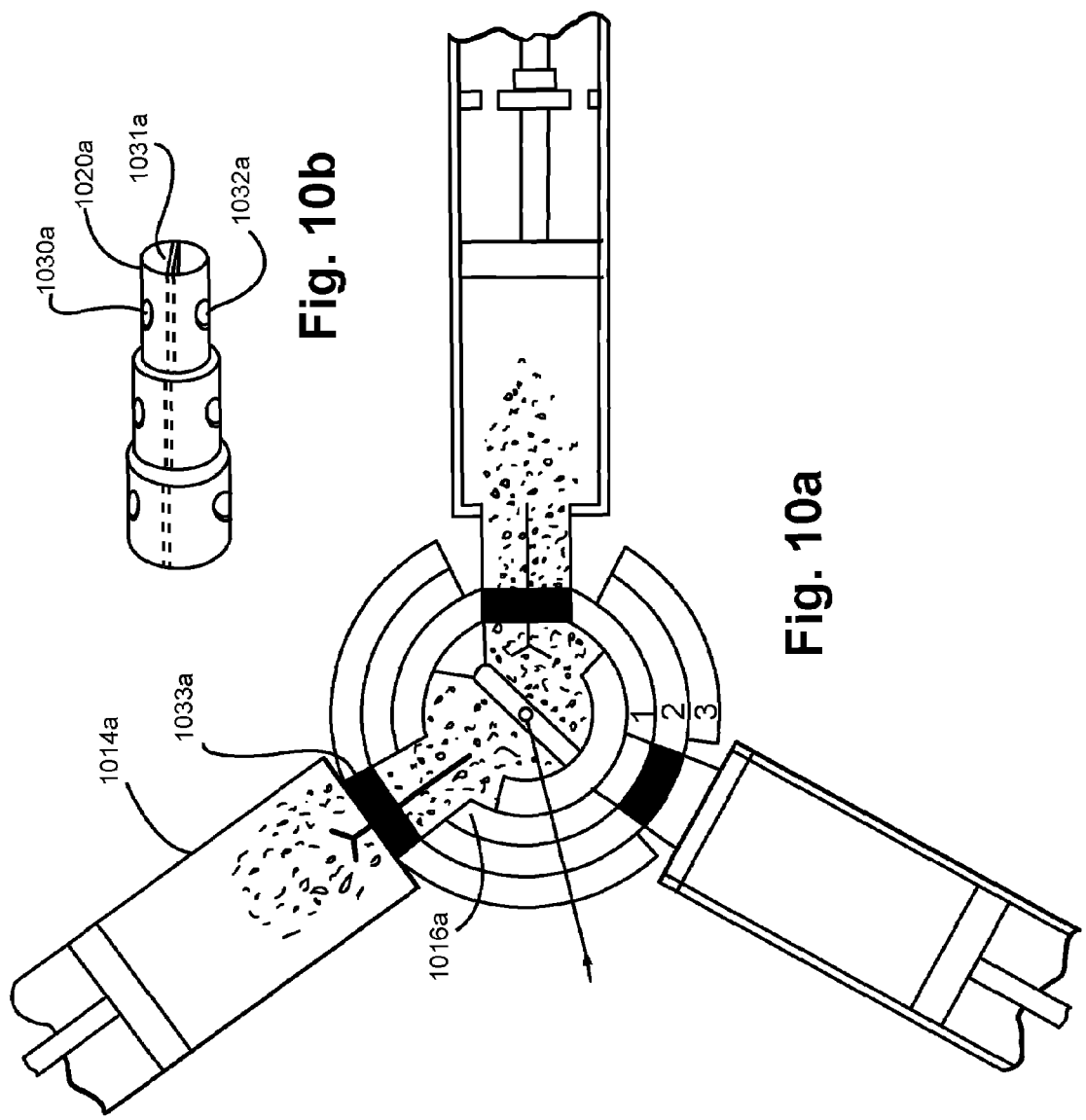

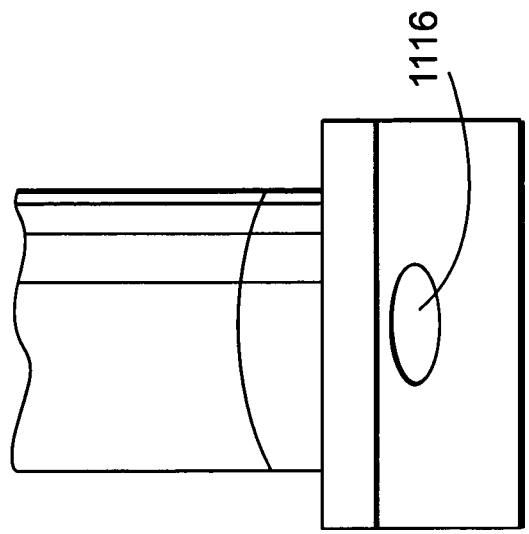
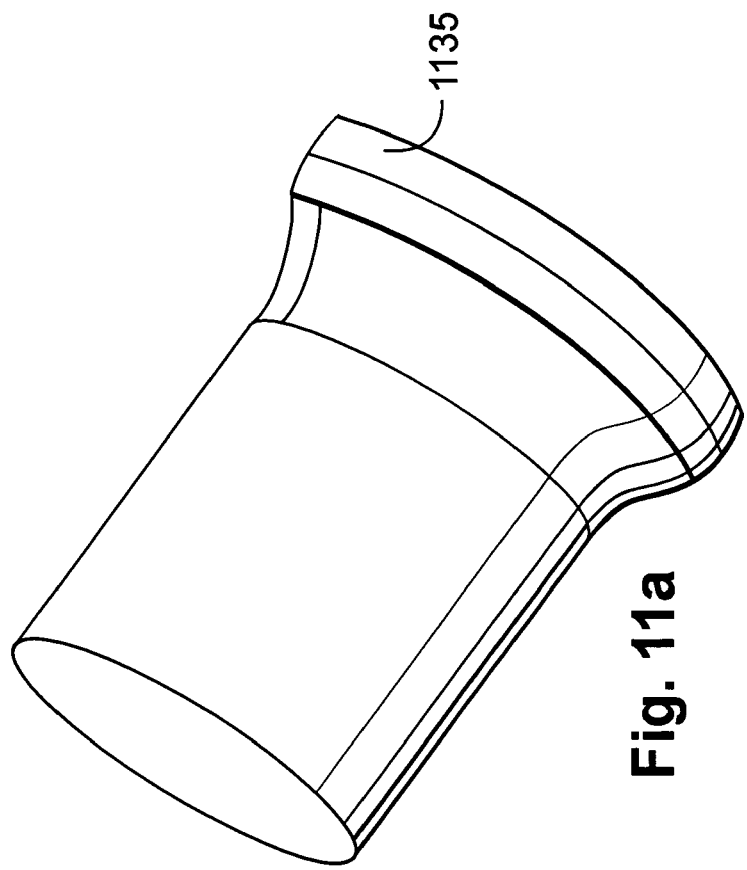

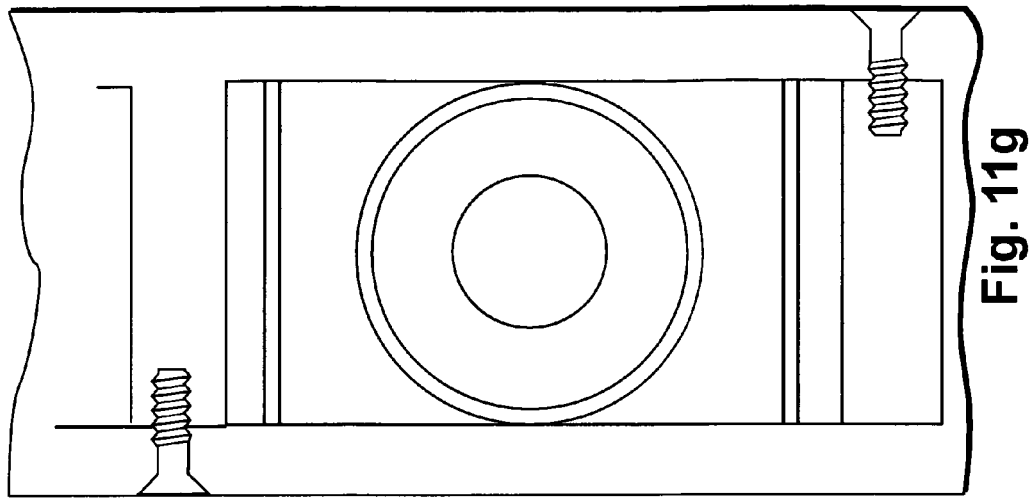
Fig. 11g
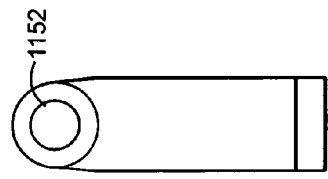
Fig. 11f
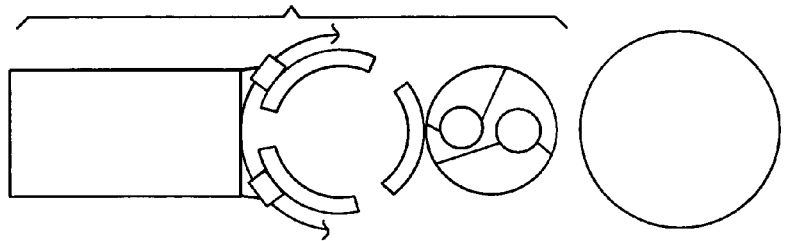
Fig. 11c
Fig. 11e
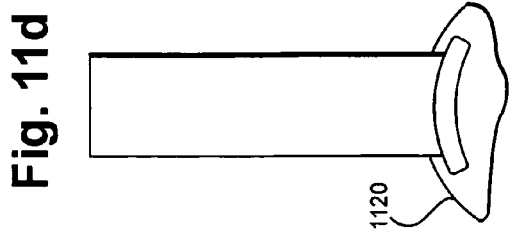
Fig. 11d

RADIAL ROTARY ENGINE WITH ENERGY STORAGE

CROSS REFERENCE TO RELATED APPLICATIONS

This application is a divisional/continuation-in part of application Ser. No. 10/946,549, filed Sep. 22, 2004 now abandoned, which claims the benefit of U.S. Provisional Application Ser. No. 60/570,440, filed May 13, 2004, entitled Rotary Aircraft Engine/Power Generator, both of which are incorporated herein by reference. This application also claims the benefit of U.S. Provisional Application 60/794,144, filed Apr. 24, 2006, entitled Radial Rotary Engine with Energy Storage, which is also incorporated herein by reference.

BACKGROUND OF THE INVENTION

1. Field of the Invention

The present invention is directed to a rotary engine power transmission system for use in vehicular as well as other applications.

2. Summary of the Invention

The power system includes a rotary engine or pump, which may be pneumatic or hydraulic in configuration. The power system comprises two separate components whose purpose is to convert rotational force into pneumatic or hydraulic pressure where that same pressure can be reconverted back into rotational force. This conversion can be bi-directional, meaning the transmission of rotational force can be from a source to a driven component, or from the driven component back to the same source. This provides for a regenerative braking action in vehicular applications. The purpose in a vehicular specific application is to convert rotational source energy into rotational power at the vehicles wheels, for acceleration, and to reverse this process to recapture deceleration losses. It would not be possible to list all the potential applications in this document but they would be considered to be any application where such a drive system would provide improvements in overall system efficiency. These applications could be in any device where the application of power in a place that is remote from the power source is desired. This could be in any transportation device but should not be limited to this specific field.

The basic configuration of this pump-motor is an improvement on the rotary Gnome aircraft engine of the WW1 era. The Gnome engine utilized a fixed crankshaft with the engine block, pistons and connecting rods rotating around the fixed crankshaft with the crankshaft journal providing the necessary offset to initiate reciprocation between the pistons and cylinders. Since this was accomplished by differential axes of rotation of the mass of the engine block and the pistons and connecting rods, the reciprocation normally associated with fixed block designs does not occur, therefore, the conversion of energy is more efficient than in a conventional reciprocating design.

The pump-motor of the present invention comprises preferably four cylinders and pistons with the cylinders attached to the moveable crankshaft journal and the pistons attached to the perimeter of the rotating pump housing. At the journal where the four cylinders rotate around the fixed shaft, there are passages present that allow a fluid or gas to pass into the cylinders, normally two passages would exist, but in some applications this number could be greater. A fluid entering the cylinder under pressure would force the piston away from the cylinder. That motion would be transferred to the perimeter of the block and become a rotary motion of the whole pump block-housing. In another configuration a fluid could enter at either end of the locating points of the piston-cylinders in relation to the engine block which can also serves as a flywheel to store energy.

The rotating pump housing of the present invention is supported independently of the crankshaft, unlike the original aircraft rotary engine. In the support housing for the bearings of the rotating block a shaft would pass through the housing, at the end of this shaft the offset crankshaft journal would be positioned. This would allow the crankshaft journal to be moved from a position where there would be a relative offset, in relation to the block's axis of rotation, to a position where there would be no offset. The pistons would remain stationary in their respective vertical positions in their individual cylinders even though the complete assembly would continue to rotate. By this action the pump-motor becomes a variable displacement pump-motor with a displacement range of from zero to twice the amount of crankshaft journal offset adjustment. If the journal adjustment was a maximum of 2 inches the total stroke would be 4 inches.

When a fluid is allowed to enter the pump-motor no pressure or flow is generated when the stroke position is zero. This constitutes a "neutral" position in a conventional transmission. As the stroke is increased the volume of the fluid forced is out by displacement increases. At lower volumes the pressure available would be greater. As the stroke is increased the volume of the fluid increases while the pressure would decrease. When the changeable stroke position is reversed 180 degrees a reversing of the flow of fluid would occur providing a "reverse" position when motion in reverse of normal motion is desired. The illustration in the accompanying art represents the 3 different positions. It should be understood that any position between the limits of the range in the illustrations is also available.

OBJECTS OF THE INVENTION

Accordingly, it is a principal object of a preferred embodiment of the invention to provide an application where such a rotary drive system is used to provide improvements in overall drive efficiency. This application could be in any device where the application of power in a place that is remote from the power source is desired It is another object of the invention to provide a rotary pump that can utilize high pressure fluid to covert the pressure to a rotary motion.

It is a further object of the invention to provide a rotary pump that can convert rotary motion to high pressure fluid storage means Still another object of the invention is to provide a means for recovering braking energy in a vehicle through a rotary pump.

Still another object of the invention is to provide a novel transmission means in a rotary pump or engine.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIGS. 10a & 10b are partial cross sectional views of a pump and journal valving according to an embodiment of the invention.

FIGS. 11a-11g are partial cross sectional views of a pump and journal valving according to another embodiment of the invention.

DETAILED DESCRIPTION OF THE PREFERRED EMBODIMENT(s)

The present invention is to designs for both rotary engines and rotary pumps that can be used to power a vehicle, to capture and store previously wasted energy when operated as a pump, or for other purposes.

Figure 5:
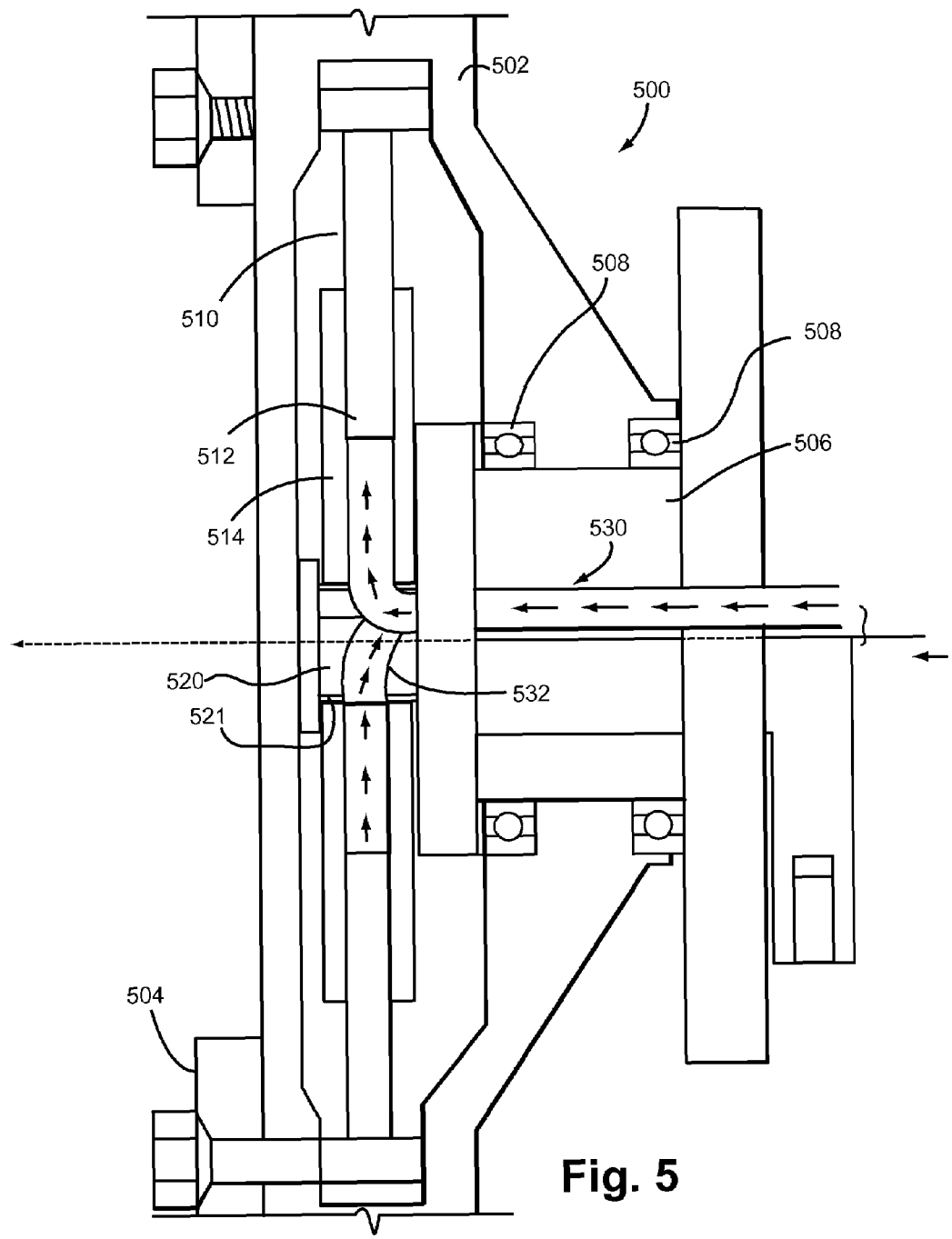
FIG. 5 is a partial cross sectional view of a pump according to an embodiment of the invention.

FIG. 5 is a break away view of a rotary pump 500 according to a preferred embodiment of the invention for receiving a pressurized fluid and converting the pressuring into rotary motive force to drive, for example the wheels of an automobile. The pump may be operated as an engine or as a pump. For the purposes of this application, unless otherwise specified, an engine shall refer to the device used as an internal combustion engine and a pump shall refer to the device operate to create or be driven by high pressure fluid, preferably an incompressible fluid such as hydraulic fluid.

In the embodiment shown, the pump 500 is mounted to a vehicle axle by engine housing 502. The rim 504 of a wheel is mounted to the axle by bolts ("lug nuts") so that a portion of the pump can rotate with the axle 503 about the hub 506. Appropriate bearings 508 or other means are provided to allow the axle to rotate with minimal friction.

The pump 500 itself includes a number of pistons 510. The piston is fixed at one end to the engine housing 502. The other end 512 ("the piston head") is slidably located within a cylinder 514. While two pistons and cylinders are visible in the drawing are shown, any number may be used, with four being the preferred number for balance and other reasons. The pistons and cylinders rotate together about the center cam 520. The cam is substantially cylindrical, but has a center axis spaced apart from the center line A-A of the axle and engine housing. As shown the eccentric causes the piston to complete a cycle once per revolution. The stroke is a function of the distance that the center of the journal is away from the line A-A.

The cam is journaled within the cylinder 514 and when operated as a regeneration pump, the motion of the wheels causes the housing 502 to turn causing cylinder to approach or move away from the piston head 512 as the piston (and housing) rotates about centerline A-A and the cylinders rotates about the centerline of the fixed journal 521. The difference in the centerline of the axle and the journal causes a stroke of that distance in the pump. The stroke of the pistons causes fluid (e.g., gas, liquid, steam, air, etc.) to be pumped from an inlet 530 to an outlet 532 as will be described further on. The fluid may be collected in an appropriate reservoir downstream of the outlet and thereinafter used to power the pump in reverse to cause the pump to drive the wheels.

Figure 7:
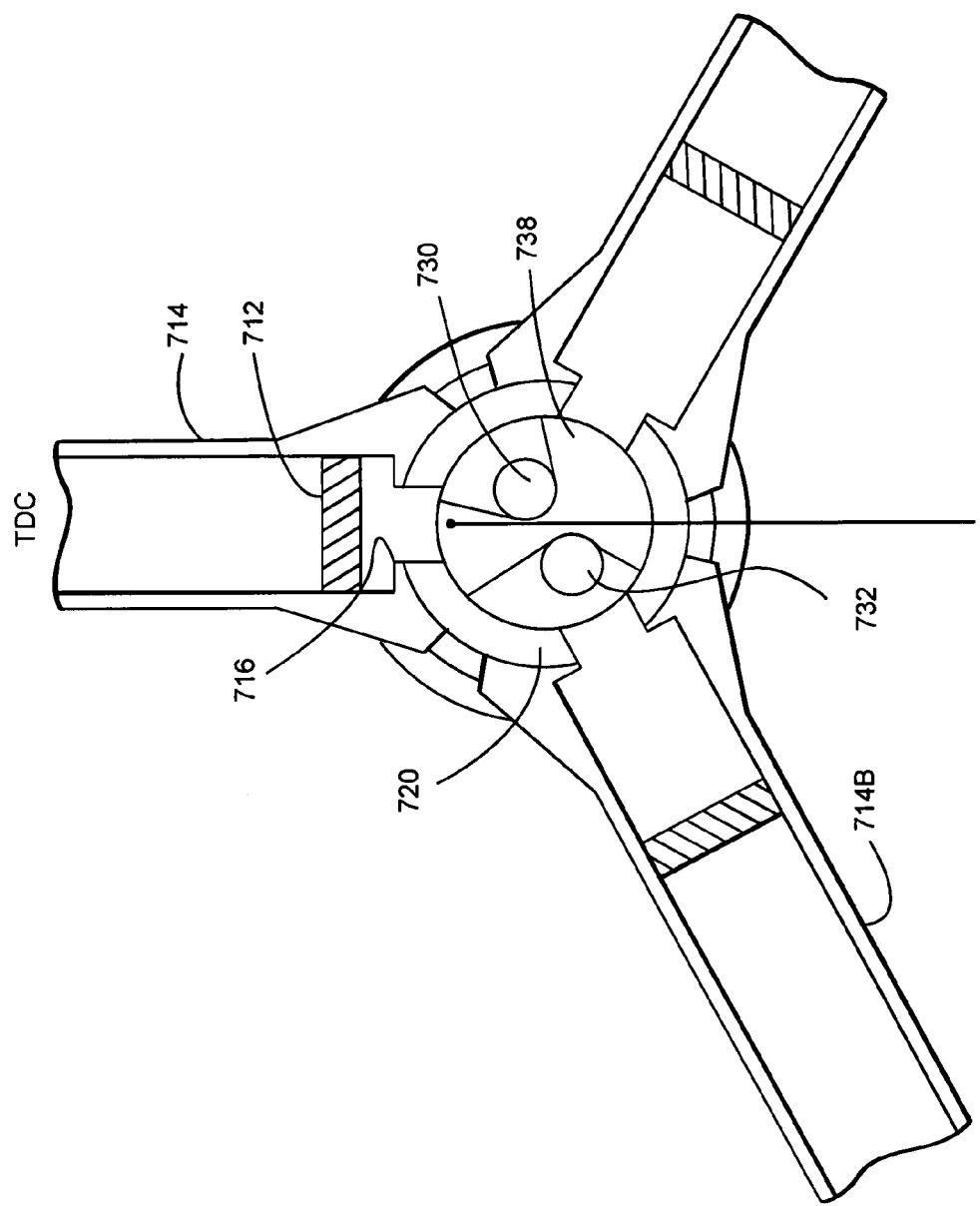
FIG. 7 is a partial cross section view of a pump according to an embodiment of the invention.

FIG. 7 shows a three cylinder pump from the side illustrating valving according to a preferred embodiment of the invention and operating under the same principals as described in FIG. 5. When operated as a pump to drive the wheels, a pressurized inlet 730 receives pressurized fluid from an outside source (see for example FIG. 8 as described later hereunder). When the cylinder 714 aligns with the inlet 730, a port 716 allows pressurized fluid into the cylinder thereby pressing against piston 712. Piston 712 is driven outwardly away from the port. As this occurs, the pump is caused to rotate about the journal 720 since the housing holding the pistons is collared about the journal, motion of the pistons causes the housing to move about the journal. As the cylinders move about the journal, the port 716 will remain in contact with the inlet as the piston moves outwardly. It should be noted that as long as any part of the port remains in communication with the inlet, pressurized fluid will continue to push against the piston. As the cylinders continue the rotation, the wall 738 will begin to block the port 716 until it is fully blocked. As this point, a second cylinder 714B will begin to be in contact with the inlet to continue rotation of the pump. The pressurized fluid in the first cylinder 714 will continue to expand forcing the piston outward. The length of wall 738 is chosen according to the type of fluid and pressure of the fluid. The wall will be longer for compressible fluids such as steam or air, where the piston can continue to expand the fluid for various efficiencies considerations. When an incompressible fluid (e.g., a liquid) is used, the wall 738 length between the pressure phase and the outlet phase may be only the length of the port to prevent the port from being unduly exposed to both inlet pressure and exhaust port and to prevent resistance of the fluid against the return of the piston, as well as to prevent cavitation, boiling, etc. Once the piston begins its travel downwardly, the cylinder is in communication with the outlet 732 through port 716 to expel ("exhaust") the fluid back out of the cylinder. The period between exhaust and intake is again chosen based on the type of fluid used, etc. The walls may have variable lengths by using dual collars or other means to change the effective sizes of the openings relative to the alignment with the port 716. This may be necessary to change for instance, the amount of pressurized fluid to change torque, etc.

Figure 8:
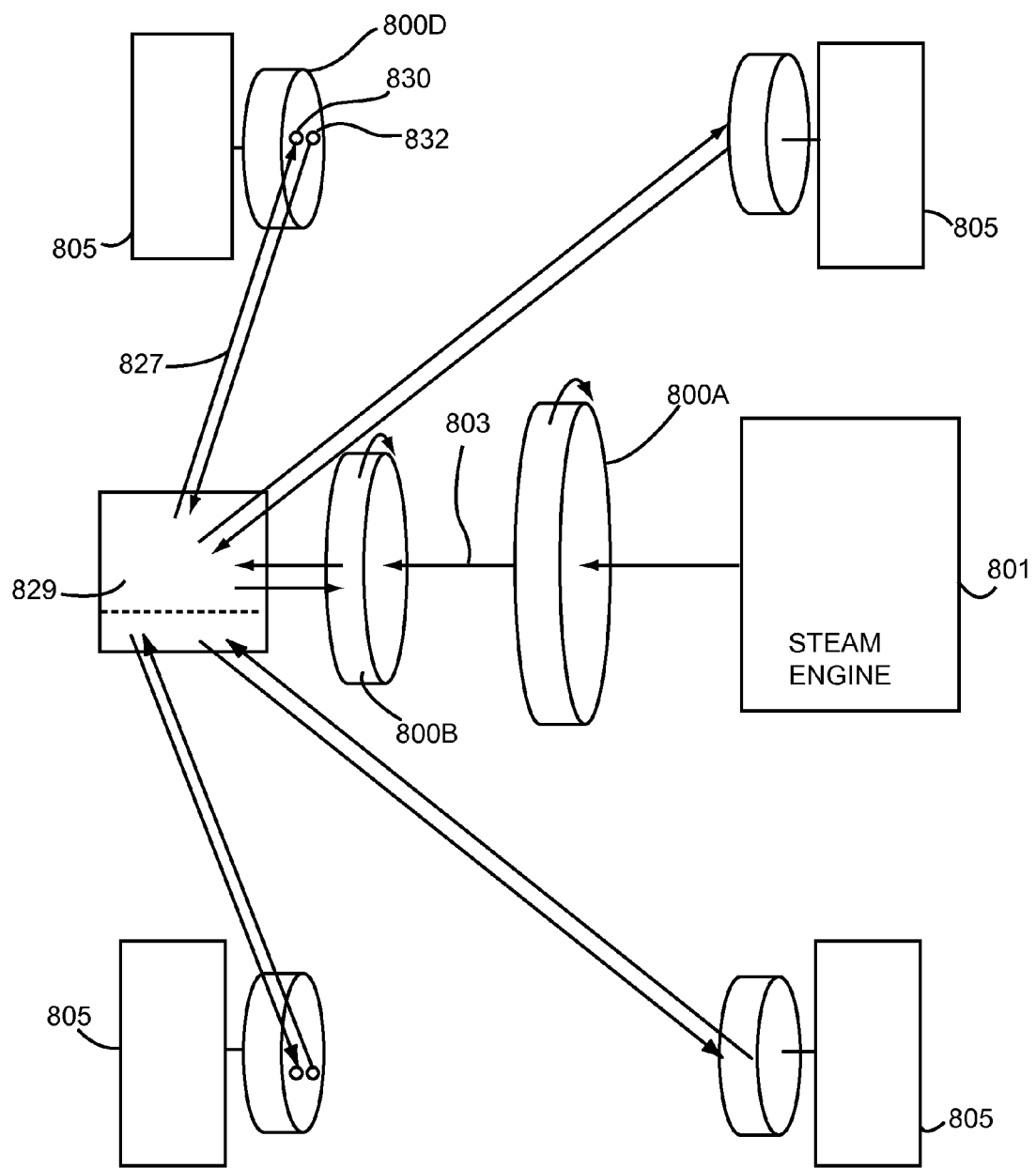
FIG. 8 is a diagrammatic view of a drive system utilizing pumps according to an embodiment of the invention in reverse position.

FIG. 8 shows different versions of the engine/pump used in a complete system to drive four wheels 805 using a steam engine 801. The steam engine generates an amount of steam that drives a first pump 800A using the steam as a pressurized inlet fluid. The steam drives the first pump 800A in a rotary motion as described above. The pump may be connected by a common drive shaft 803 or by other means to drive a second pump 800B. This second pump 800B rotates with pump 800A. The rotation of the pump 800B may be used to pressurize fluid in a reservoir 829. This may be achieved, for instance by pumping the fluid from a low pressure return to a high pressure reservoir within the reservoir, or by pressurizing a diaphragm, piston or other device acting on a port of the fluid as are well known in the art. Valves may be used to prevent over pressure or to otherwise selective connect or separate the high pressure reservoir from the low pressure return.

The pressure reservoir with the fluid reservoir 829 may then be connected by appropriate pipes, tubing, hoses, etc. 827 to the high pressure inlet 830 of individual pumps 800D to drive the individual pumps 800D as described above to drive the wheels 805.

Figure 1:
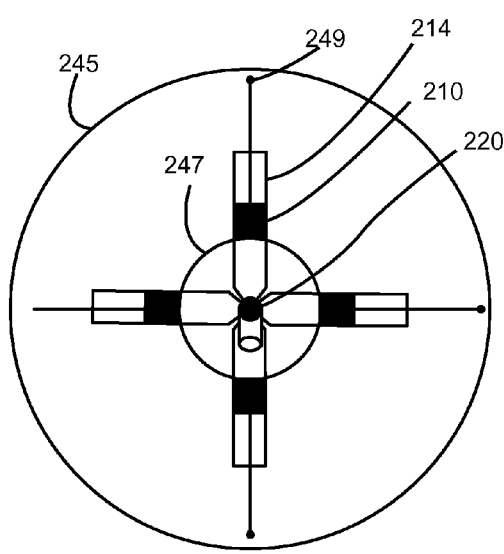
FIG. 1 is a diagrammatic view of a transmission according to an embodiment of the invention in neutral position.
Figure 2:
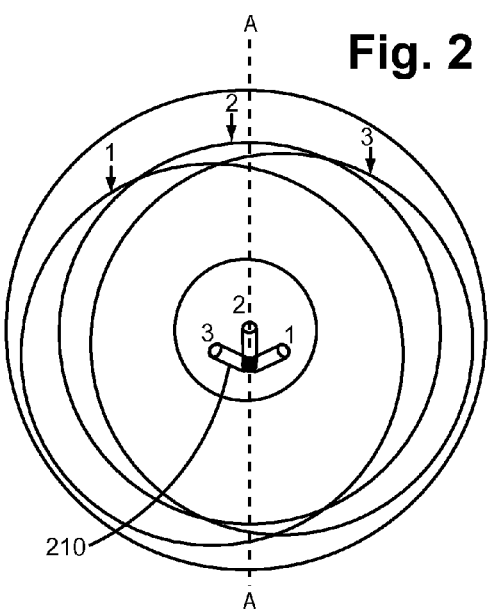
FIG. 2 is a diagrammatic view of a transmission according to an embodiment of the invention showing connector locations and overlapping pump rotation patterns according to the selected transmission position.

FIGS. 1-4 show a transmission according to a preferred embodiment of the invention. In order to control motion of the wheels, it is necessary to control the application of the driving pumps to the wheels otherwise the wheels will always rotate when the steam engine is driving the first pump 800A. As described above, the stroke of the piston is a function of the distance that the journal's centerline is off of the housing centerline A-A. By controlling the centerline of the journal in at least the individual driving pumps 800D, the amount of power to the wheels can be controlled. FIG. 2 shows an arm 210 that controls the position of the center of the journal 220 of the pump. As the arm 210 moves, the journal moves from a first extreme 1 to a centered 2 to a third position 3. If we call the first position "forward" and define the rotation of the pistons about that centric the "forward" direction, the whenever the selector is in the first position, the wheels will move in the forward direction. One skilled in the art would appreciate that the "forward" direction should be coordinated between the multiple individual pumps 800D, such that they all rotate the wheels in a similar directions. The pumps on the left hand side of FIG. 8 may operate in the mirror image of the pumps on the right hand side of FIG. 8 since the inlets and outlets will all travel back towards the reservoir 829.

To remove power to the wheels, the selector is moved to cause the arm 210 to move to the second or neutral position 2. In this position, the center of the journal 220 is aligned on centerline A-A with the center of the housing. Since the eccentric action of the journal is removed, the stroke of the pistons is reduced to zero. The pump 800D may still rotate about the journal under the action of, for example, the wheels 805, but since the pistons are not moving, the pump will effectively "freewheel" about the journal.

Figure 3:
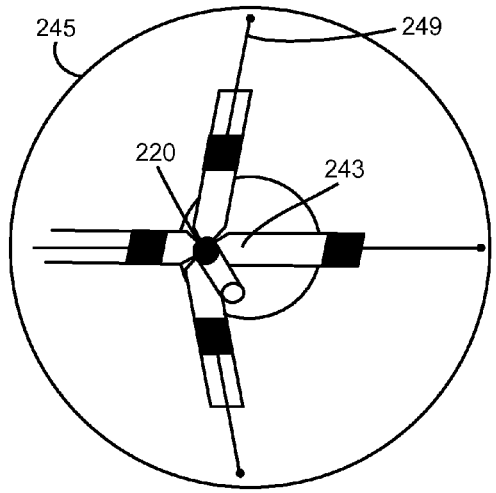
FIG. 3 is a diagrammatic view of a transmission according to an embodiment of the invention in forward position.
Figure 4:
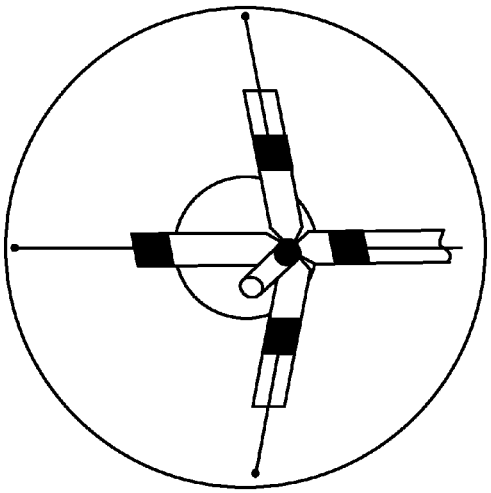
FIG. 4 is a diagrammatic view of a transmission according to an embodiment of the invention in reverse position.

Moving the selector to the third position causes the housing to rotate about the eccentric again with the stroke of the pistons increased again to cause a pumping action. However, the relation of the direction of the movement of the pump housing relative to the journal has changed. Now, the housing moves about the journal in the opposite direction. However, the inlet and outlet directions do not change, only the relative direction of the housing about the journal, when the pistons are traveling downwardly, they will still exhaust into the exhaust chamber 832 and intake fluid from the inlet 830. As shown in FIG. 1, as the outer circle 245 moves about the inner circle, the distance from the journal 220 to a point 249 on the outer circle 245 will not change and thus there is no stroke of the piston 212 in the cylinder 214. As shown in FIG. 3, as the outer circle 245 moves about the journal, the distance from point 249 to the journal 220 changes causing a stroke of the piston within the cylinder. As shown in FIG. 3, in a clockwise rotation the cylinder is approaching the piston, so this is a compression stroke. Referring now to FIG. 4, the selector has been moved to position 3. No other changes have been made from FIG. 3 to FIG. 4, however, as the device is rotated clockwise, the cylinder would now be moving away from the cylinder. However, one would recognize that when the pump is used to drive the wheels, in FIG. 3, pressurizing cylinder 214 would cause the piston to move away from the journal causing a counterclockwise rotation, whereas in FIG. 4, pressurizing the cylinder 214 would cause a clockwise rotation.

Thus the location of the eccentric can be used to power, disengage power or reverse power of the pump on the wheels. This same transmission could be used on the pumps 800A and 800B, but is more likely to be used to move only from forward to neutral to forward. This allows the pumps to be driven only when needed and to take advantage of their rotational momentum when not in use. The transmission system also acts as a continuously variable transmission system as the stroke continuously changes from the forward selector position to the neutral position to the reverse position.

The pump may be used to drive the wheels or to recapture energy normally lost as heat in braking. During braking the flow of the fluids can be reversed to generate high pressure fluid in the reservoir from the rotational motion of the wheels. This drag on the wheels will aid in stopping the car by increasing the frictional drag on the wheels to aid or replace normal braking (e.g., caliper/disk brakes). In operation, high pressure fluid is generated by the pump due to the rotation of the pump with the wheels. The high pressure fluid exits the low pressure line and is returned to the fluid reservoir. A valve may be used so that fluid pressure above a certain amount is able to open the valve to communicate with the high pressure chamber so that pressure is always added to the chamber and the action of the pumping does not act to let pressure leak from the chamber. Alternatively, valving may be used so that high pressure fluid exiting the pump is channeled to the high pressure line (instead of the normal exhaust line). Valving may act differently depending on whether the individual pumps 800D are in the drive mode or the recapture mode to direct high pressure fluid accordingly.

Figure 6:
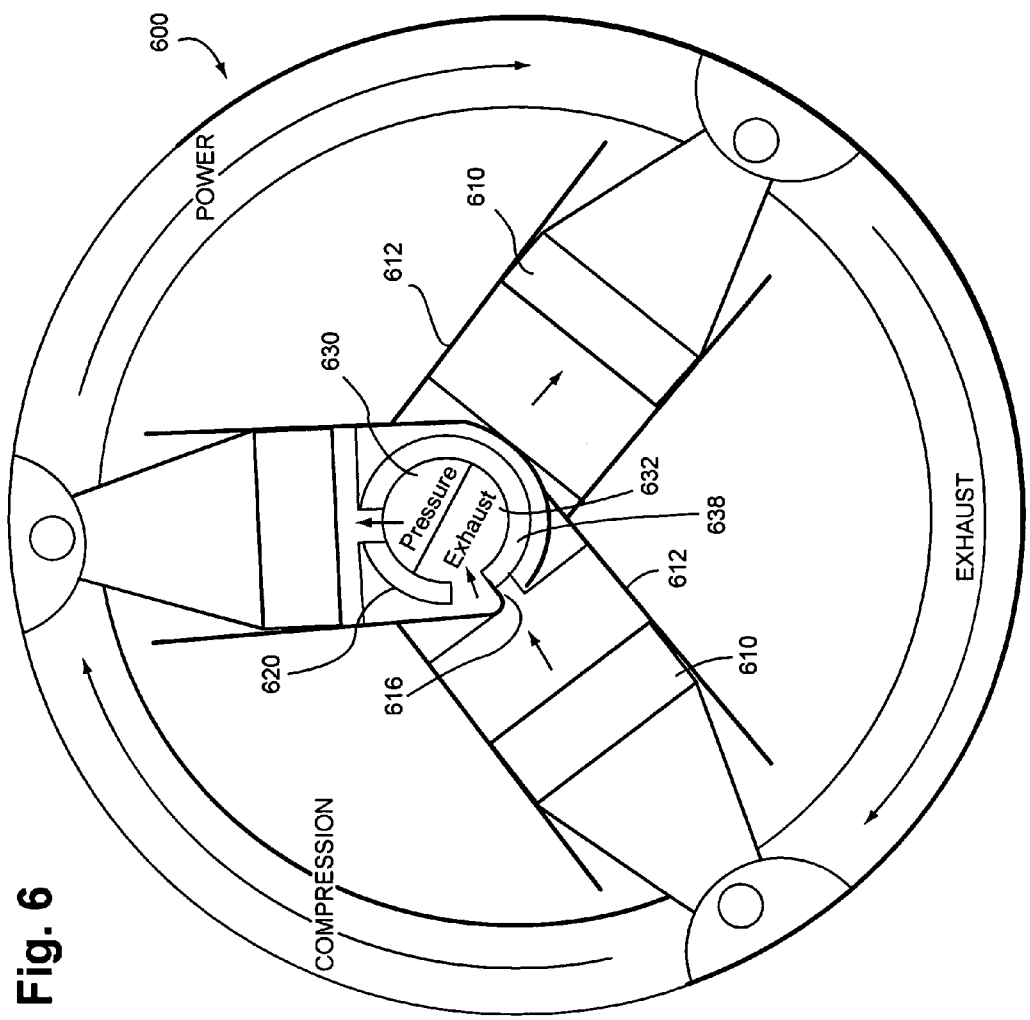
FIG. 6 is a partial exploded view of a pump according to an embodiment of the invention.
Figure 9:
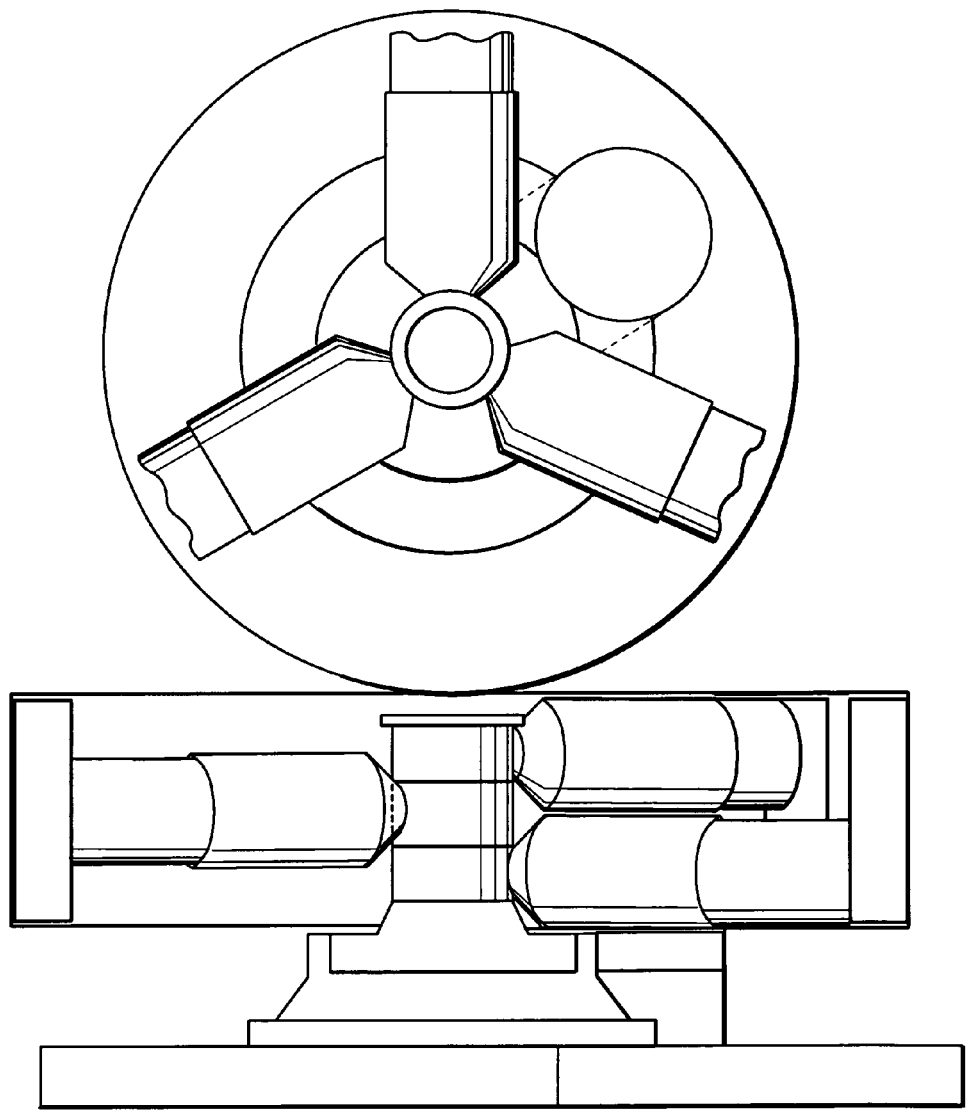
FIG. 9 is a partial exploded, side view of a pump according to an embodiment of the invention.

FIG. 6 shows a three-cylinder version of the device 600 used as an engine, with defined compression, exhaust and power cycles illustrated. Each cylinder 612 terminates at an end opposite from the piston 610 in a port 616. The port is selectively in communication with one of two internal passageways 630,632. The two ports are contained within journal 620. A wall is provided between the exhaust and pressure port to seal each from the other. Ports for successive cylinders are located axially downstream (i.e., orthogonal to the plane cross section depicted. (See FIG. 9) and sealed from each other cylinder. As the cylinders 612 rotate about the journal, the port 616 is in contact with the internal exhaust passageway 632 as the cylinder moves towards the piston 610 to exhaust fluid through the exhaust passageway. At this time, no other cylinder port is in communication with the exhaust passageway, and each port is sealed from the other ports by appropriate seals, as one of ordinary skill in the art would appreciate.

Openings in the journal wall 638 are sized to only allow the port to align with the openings while the cylinder is exhausting or intaking fluids. The opening and port may carry larger dimensions to exhaust liquids than for gases to facilitate the flow requirements therein. As the cylinder moves past the top dead center (i.e., the point where the piston has traveled within the cylinder to a position closest to the port), the port will lose contact with the exhaust port and will gain contact with the pressure/inlet. The length of the walls of the journal are not shown to scale, but are configured to control the timing of the transitions between each phase of the pump/engine.

As the cylinder draws away from the port, the fluid enters through port preferably to a point where the piston prior or near the bottom dead center (i.e., the point where the piston is in a position furthest from the port). When using highly pressurized gases, the flow may be cut off sooner to allow the gases to continue to expand in the chamber without allowing additional fluid in the chamber. This increases efficiency by not wasting high pressure fluid as the piston reaches near the bottom dead center, and reducing the amount of fluid that needs to be expelled.

When acting as an engine, the engine will preferably fire every second rotation, however it could be configured to run as a two cycle firing once per cycle using a supercharged air source, for example. In the four cycle engine (i.e., one ignition per two rotations), one rotation will exhaust and intake new fluid, and one rotation will compress and ignite the fluid for a power stroke. When the compression cycle begins, the port is sealed by at least the wall of the journal. No fluid is allowed to escape during what would normally be the exhaust stroke. Instead, compression of the fluid (preferably an air/fuel mixture) in the cylinder occurs as the cylinder travels towards the piston compressing the chamber and its contents. At a point of maximum compression (i.e., when the piston is at or near closest to the port), the air/fuel is ignited, expanding the gases within the chamber to drive the piston outward with enough energy to continue the rotation of the engine and a wheel or other device attached thereto (while preventing new fluid from entering what would normally be the intake stroke). Fluid is then expelled as the port is allowed to realign with the outlet port. One skilled in the art would recognize the general cycles of an internal combustion engine and the advantages thereto. For a further description of the cycles, see U.S. patent application Ser. No. 10/946,549, filed Sep. 22, 2004 to Greenwell, which is incorporated herein by reference.

Various valves may be used in the journal to alternatively connect multiple cylinders to the single inlet and single exhaust shown in the preferred embodiment. One such alternative journal valving is shown in FIGS. 10a and 10b. Three concentric tubes form the journal. The innermost sleeve 1020a has ports 1030a and 1032a at a first location to selectively mate with a first cylinder 1014a. A wall 1031a divides the inner chamber of sleeve 1020a into respective high and low pressure ports to communicate with the reservoir 829. Each port (e.g., 1016a) may be threaded (e.g., 1033a) to allow the cylinder (e.g., 1014a) to be threaded directly to the respective port. By aligning the ports of the sleeves, each cylinder can communicate with the appropriate inner passage of the inner sleeve 1020a. The three sleeves allow the needed play to keep the cylinders in communication with the inlet and exhaust without causing any torque on the connection as the pump rotates and/or changes from forward to neutral to reverse. Appropriate seals between the ports and between the sleeves may be provided to further isolate the ports from each other.

Another connection between the cylinder and the journal is shown in FIGS. 11A through 11G. The cylinder may end in a radial component 1135 configured to mate with an outer circumference of the journal 1120. The radial component has a port 1116 in a lower radius in communication with the inner portion of the cylinder. FIG. 11e shows the cylinder connected to the journal by screws. FIG. 11G shows a partial detail view. FIG. 11F shows details of the piston mounted to pivot about an upper pivot 1152. When the piston is inserted into the cylinder, the pivot allows the piston to maintain alignment with the cylinder as it rides up and down within the cylinder pushing fluid into and pulling fluid out of the port 1116.

Figure 12:
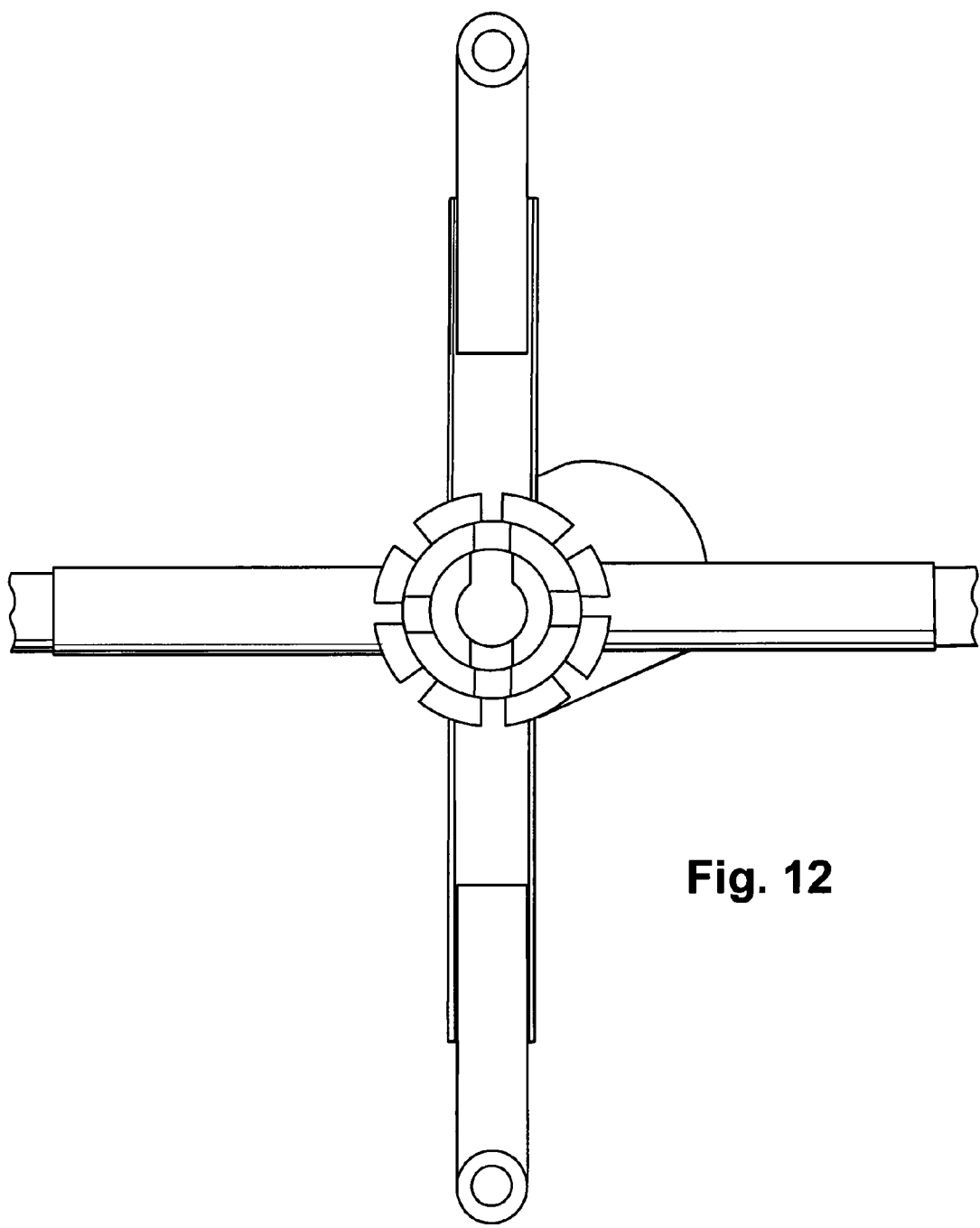
FIG. 12 is a partial exploded, top view of a pump according to an embodiment of the invention.

FIG. 12 is a diagrammatic, perspective view of the pump with other parts removed to show the connection of the cylinders to the inner sleeve.

It is to be understood that the present invention is not limited to the sole embodiment described above, but encompasses any and all embodiments within the scope of the following claims.

I claim:

1. A power system including a first radial rotary pump, said pump including:
   a rotatable housing disposed to rotate about a first axis of rotation and having a plurality of pistons pivotably mounted thereto,
   a journal having a fluid inlet passage and a fluid outlet passage therein, said journal having a second axis of rotation;
   a plurality of cylinders connected to said journal and selectively in communication with said fluid inlet passage and selectively in communication with said fluid outlet passage, wherein said plurality of cylinders rotate about said second axis of rotation;
   said plurality of pistons reciprocatingly disposed within each one of said plurality of cylinders,
   a selector arm connected to said journal for selectively changing said second axis of rotation from a first position spaced apart from said first axis of rotation to a second position coaxial with said first axis of rotation.

2. The power system of claim 1, further comprising:
   a steam engine for driving said first radial rotary pump at a first radial velocity;
   said first radial rotary pump having an output shaft for driving second radial rotary pump;
   said second radial rotary pump pumping a fluid from a low pressure reservoir to a high pressure reservoir.

3. The power system of claim 2, further comprising:
   a plurality of driven radial rotary piston pumps each connected to a vehicle wheel for driving the wheel in a rotary motion;
   a plurality of fluid lines connected between the high pressure reservoir and said plurality of driven radial rotary piston pumps for driving said plurality of radial rotary piston pumps.

4. The power system of claim 3, wherein when said selector arm on each of said plurality of driven radial rotary piston pumps is moved to the first position, said plurality of wheels are driven in a forward direction and when said selector arm on each of said plurality of driven radial rotary piston pumps is moved to the second position the wheels are not driven by said driven radial rotary piston pumps.

5. The power system of claim 4, wherein when said selector arm on each of said plurality of driven radial rotary piston pumps is moved to a third position, said plurality of wheels are driven in a reverse direction.

6. The power system of claim 3, further comprising:
   a valve for selectively discontinuing high pressure fluid from said high pressure reservoir to said plurality of driven pumps;
   whereby at least one wheel drives at least one of said plurality of driven radial rotary piston pumps to pump fluid into said high pressure fluid reservoir.

7. A power system including a pump having a variable stroke, said pump including:
   a rotatable housing disposed to rotate about a first axis of rotation;
   a plurality of pistons pivotably mounted within the housing and rotating about the first axis of rotation;
   a journal pivotably mounted to pivot being a first and second position and having a fluid inlet passage and a fluid outlet passage therein, said journal defining a second axis of rotation;
   a plurality of cylinders mounted about said journal and selectively in communication with said fluid inlet passage and selectively in communication with said fluid outlet passage, wherein said plurality of cylinders rotate are centered about said second axis of rotation;

said plurality of pistons reciprocatingly disposed within each one of said plurality of cylinders such that rotation of said rotatable housing causes said pistons to selectively slide within said cylinders to alternately draw fluid in from said inlet passage and expel fluid out of said cylinder to said fluid outlet passage;

a selector arm connected to said journal for selectively pivoting said journal from a first position wherein said second axis of rotation is parallel to and spaced apart from said first axis of rotation and a second position coaxial with said first axis of rotation, thereby changing a length of a stroke that the pistons slide within the cylinders per rotation of the housing.

8. The pump of claim 7, wherein when said first axis of rotation is coaxial with said second axis, the pistons do not move relative to the cylinders, and therefore have a stroke length of zero.

9. The power system of claim 7, further comprising:
a steam engine for driving said first radial rotary pump at a first radial velocity;
said first radial rotary pump having an output shaft for driving second radial rotary pump;
said second radial rotary pump pumping a fluid from a low pressure reservoir to a high pressure reservoir.

10. The power system of claim 9, further comprising:
a plurality of driven radial rotary piston pumps each connected to a vehicle wheel for driving the wheel in a rotary motion;
a plurality of fluid lines connected between the high pressure reservoir and said plurality of driven radial rotary piston pumps for driving said plurality of radial rotary piston pumps.

11. The power system of claim 10, wherein when said selector arm on each of said plurality of driven radial rotary piston pumps is moved to the first position, said plurality of wheels are driven in a forward direction and when said selector arm on each of said plurality of driven radial rotary piston pumps is moved to the second position the wheels are not driven by said driven radial rotary piston pumps.

12. The power system of claim 11, further comprising:
a valve for selectively discontinuing high pressure fluid from said high pressure reservoir to said plurality of driven pumps;
whereby at least one wheel drives at least one of said plurality of driven radial rotary piston pumps to pump fluid into said high pressure fluid reservoir.

13. The power system of claim 7, further comprising:
a steam engine for driving said first radial rotary pump at a first radial velocity;
said steam engine driving a second radial rotary pump;
said second radial rotary pump pumping a fluid from a low pressure reservoir to a high pressure reservoir.

14. A rotary pump including:
a rotatable housing disposed to rotate about a first axis of rotation and having a plurality of pistons pivotably mounted thereto,
a journal having a fluid inlet passage and a fluid outlet passage therein, said journal having a second axis of rotation;
a plurality of cylinders connected to said journal and selectively in communication with said fluid inlet passage and selectively in communication with said fluid outlet passage, wherein said plurality of cylinders rotate about said second axis of rotation;
said plurality of pistons reciprocatingly disposed within each one of said plurality of cylinders such that rotation of said rotatable housing causes said cylinders to selectively slide about said pistons to alternately draw fluid in from said inlet passage and expel fluid out of said cylinder to said fluid outlet passage;
a selector arm connected to said journal for selectively pivoting said journal from a first position wherein said second axis of rotation is parallel to and spaced apart from said first axis of rotation and a second position coaxial with said first axis of rotation, thereby changing a length of a stroke that the pistons slide within the cylinders per rotation of the housing.

* * * * *